United States Patent
Bennauer et al.

(10) Patent No.: US 11,008,895 B2
(45) Date of Patent: May 18, 2021

(54) STEAM TURBINE CONTROL

(71) Applicant: Siemens Aktiengesellschaft, Munich (DE)

(72) Inventors: Martin Bennauer, Bottrop (DE); Marc Borowski, Moers (DE); Christoph Schindler, Essen (DE); David Veltmann, Essen (DE); Michael Winkel, Dorsten (DE)

(73) Assignee: Siemens Energy GLobal GmbH & Co. KG, Munich (DE)

( * ) Notice: Subject to any disclaimer, the term of this patent is extended or adjusted under 35 U.S.C. 154(b) by 0 days.

(21) Appl. No.: 16/647,248

(22) PCT Filed: Aug. 22, 2018

(86) PCT No.: PCT/EP2018/072598
§ 371 (c)(1),
(2) Date: Mar. 13, 2020

(87) PCT Pub. No.: WO2019/057425
PCT Pub. Date: Mar. 28, 2019

(65) Prior Publication Data
US 2020/0256217 A1 Aug. 13, 2020

(30) Foreign Application Priority Data
Sep. 22, 2017 (EP) .................... 17192638

(51) Int. Cl.
*F01K 7/08* (2006.01)
*F01K 7/24* (2006.01)

(52) U.S. Cl.
CPC .................. *F01K 7/08* (2013.01); *F01K 7/24* (2013.01); *F05D 2270/301* (2013.01); *F05D 2270/303* (2013.01)

(58) Field of Classification Search
CPC ... F05D 2270/00–821; F05D 2270/301; F05D 2270/3011; F05D 2270/3013;
(Continued)

(56) References Cited

U.S. PATENT DOCUMENTS 3,928,972 A 12/1975 Osborne
3,934,419 A * 1/1976 Aanstad .................. F01D 17/24
60/660
(Continued)

FOREIGN PATENT DOCUMENTS

DE 60121679 T2 7/2007
DE 102013226551 A1 6/2015
(Continued)

OTHER PUBLICATIONS

PCT International Search Report and Written Opinion of International Searching Authority dated Nov. 20, 2018 corresponding to PCT International Application No. PCT/EP2018/072598 filed Aug. 22, 2018.

*Primary Examiner* — Mark A Laurenzi
*Assistant Examiner* — Mickey H France

(57) ABSTRACT

A method for operating a steam turbine where steam turbine has at least two sub-turbines, wherein the steam turbine is paired with a steam turbine controller which has a sub-turbine controller for each of the sub-turbines, and each sub-turbine controller compares respective target values with respective actual values of the respective sub-turbine during operation in order to determine a respective control deviation for each sub-turbine.

9 Claims, 1 Drawing Sheet

(58) Field of Classification Search
CPC ...... F05D 2270/3015; F01K 7/08; F01K 7/20; F01K 7/24; F01K 7/28
USPC .................................................. 60/643–685
See application file for complete search history.

(56) References Cited

U.S. PATENT DOCUMENTS

| | | |
|---|---|---|
| 4,118,935 A | 10/1978 | Andersson |
| 5,042,246 A | 8/1991 | Moore et al. |
| 6,250,877 B1 | 6/2001 | Westphal et al. |
| 2009/0217665 A1* | 9/2009 | Holzhauer ............ F01K 23/108 60/645 |
| 2009/0249788 A1* | 10/2009 | Diesterbeck .............. F01K 7/20 60/646 |
| 2011/0056201 A1 | 3/2011 | Kluge et al. |
| 2017/0022847 A1* | 1/2017 | Yashiki ................. F01K 23/108 |
| 2017/0075326 A1* | 3/2017 | Britt ..................... G05B 19/042 |

FOREIGN PATENT DOCUMENTS

| | | |
|---|---|---|
| GB | 2074757 A | 11/1981 |
| WO | 2016206974 A1 | 12/2016 |

* cited by examiner

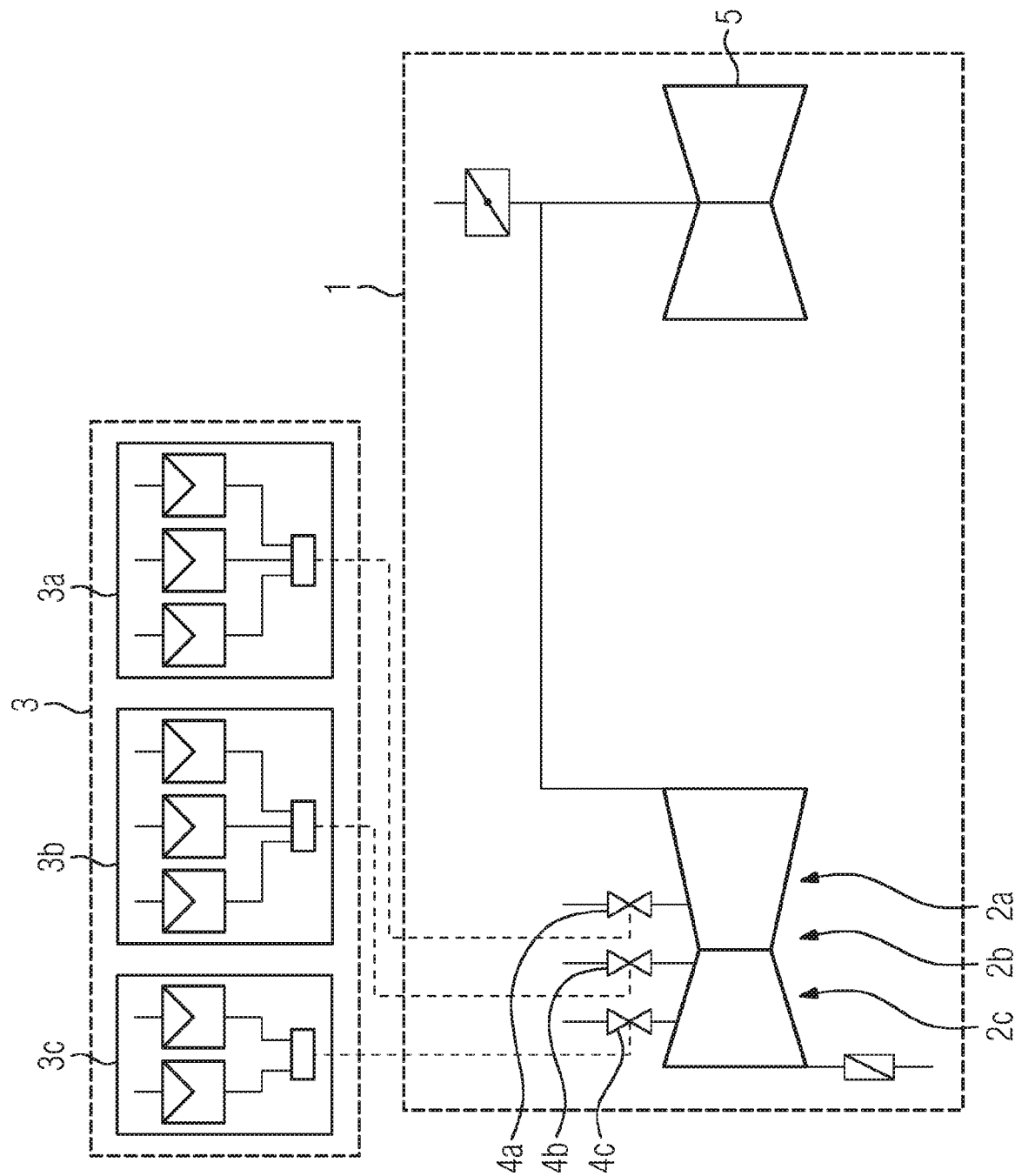

US 11,008,895 B2

STEAM TURBINE CONTROL

CROSS REFERENCE TO RELATED APPLICATIONS

This application is the US National Stage of International Application No. PCT/EP2018/072598 filed 22 Aug. 2018, and claims the benefit thereof. The International Application claims the benefit of European Application No. EP17192638 filed 22 Sep. 2017. All of the applications are incorporated by reference herein in their entirety.

FIELD OF INVENTION

The invention relates to a method for operating a steam turbine, to a steam turbine having a steam turbine controller and to a steam turbine controller.

BACKGROUND OF INVENTION

The requirements of the electricity market in a country change over the course of time. Moreover, the requirements also differ between nations, power station operators and grid operators. By way of example, a power station that is connected to a small grid and is connected to cyclic loads by its very nature places more emphasis on exact frequency control than a power station that supplies to a large pool of power stations. The same applies to the demanded starting times, load changes, down times, etc. These differences in the methods of operation lead to different requirements on the way in which the steam turbine is operated. The changing or nation-specific manners of operation in turn call for adaptation of the structure of the steam turbine control. However, the firmly prescribed structure permits a flexible reaction to demanded manners of operation and physical constraints only with great effort.

Examples that demand greater flexibility from the steam turbine controller:
- If the aim is to keep a larger controller reserve by controlling the power or the frequency using the intermediate- and low-pressure turbines and by virtue of the high-pressure turbine coasting or controlling the pressure in the high-pressure system, this requires adaptation of the structure.
- Manners of operation in which one turbine stage specifically adjusts a thermal stress and the second adjusts the total power cannot be realized without changing the controller structure.
- The overload introductions, which are supposed to be used under an optimum of efficiency and control performance, call for different target variables to be prescribed.
- If the maximum thermal stresses of a turbine stage are exhausted during the loading process, only this turbine stage is supposed to present a load more slowly. If the power of the turbine stage has been reached for the permissible stress, on the other hand, the power is supposed to increase, and hence maintain the block transient, correspondingly more quickly.

A firmly prescribed structure of the steam turbine controller reduces the flexibility of the steam turbine operation or results in considerable effort for changes to the steam turbine operating concept.

A multistage steam turbine is known e.g. from DE 60 121 679 T2.

There is thus a need to demonstrate ways in which a steam turbine can be operated more flexibly.

SUMMARY OF INVENTION

According to the invention, a steam turbine having at least two subturbines involves the use of a steam turbine controller that has one subturbine controller for each of the subturbines, wherein each subturbine controller compares respective setpoint values with respective actual values of the respective subturbines during operation in order to determine a respective control error for the respective subturbines.

Individual subturbine controllers for the process variables are thus used for each subturbine, and any physical couplings present are then portrayed only by means of the setpoint values of the individual subturbine controllers. As a result of this change, a subturbine is able to adjust its power, pressure or else thermal stresses solely according to its own stipulations and physical constraints. The complexity of the controller structure is significantly reduced thereby and the flexibility is increased in the same measure. This allows a simpler structure for the steam turbine controller, more flexible methods of operation on the basis of respective setpoint values, more flexible consideration of operating constraints and optimum operation taking into consideration efficiency and control performance.

It is possible for the subturbine controllers to operate the respective subturbines according to different modes of operation. The modes of operation can be e.g. a power control mode of operation, frequency control, speed control, fresh-steam or pre-pressure control or back pressure control. For power control, the control variable is the electrical power that is supposed to be delivered to the public grid. Frequency control is selected for operation in isolated mode, when the main grid switch is opened, since the generator then needs to supply to the separate network. This is required in the event of faults in the grid. The controlled variable in this instance is the frequency of the voltage or, indirectly, the speed of the steam turbine. Speed control, on the other hand, is selected for idling. The speed is controlled. This is the case e.g. when running up, where specific speed trajectories need to be observed. For fresh-steam or pre-pressure control, the controlled variable is the fresh-steam pressure, which varies on the basis of further loads. Indirect control via the steam turbine is faster, i.e. more dynamic, than via the burner, since steam generation in the comparison carrier, i.e. is not very dynamic. Back pressure control can be used when a low-pressure turbine stage opens into a steam rail.

Preferably, the subturbine controllers actuate respective turbine valves that are associated with the respective subturbines. The individual turbine valves provide the steam turbine with the freedom to control the individual process variables pressure of the respective subturbine, power of the subturbine, thermal stress or drop in thermal stress of the subturbine independently of one another. The turbine valves can be fresh-steam valves, which are e.g. in the form of classic throttle valves or in the form of a nozzle assembly.

According to the invention, a respective power value is set in one of the modes of operation using one of the subturbine controllers. As such, the process variable power of the subturbine can be controlled independently of other values.

Preferably, a respective pressure value is set in one of the modes of operation using one of the subturbine controllers. As such, the process variable pressure of the respective subturbine can be controlled independently of other values. Thermal constraints also now only affect the relevant subturbine.

Preferably, a respective temperature value is set in one of the modes of operation using one of the subturbine controllers. As such, the process variable thermal stress of the subturbine can be controlled independently of other values.

Preferably, the respective subturbine controllers used are PID controllers. PID controllers (proportional-integral-derivative controllers) consist of proportions of a P element, I element and D element. They can be defined either from the parallel structure or from the series structure. PID controllers are very adaptable, prevent a lasting control error, given a constant setpoint value, in the event of a sudden change of reference variable and disturbance and are able to compensate for delays, e.g. brought about by PT1 elements of the controlled system, and hence to simplify the controlled system.

Further, the invention includes a steam turbine having a steam turbine controller, and a steam turbine controller.

BRIEF DESCRIPTION OF THE DRAWINGS

An embodiment of the method according to the invention is explained below on the basis of the accompanying schematic drawing, in which:

FIG. 1 shows a schematic depiction of a steam turbine having an associated steam turbine controller.

DETAILED DESCRIPTION OF INVENTION

The depiction is of a steam turbine 1 having a steam turbine controller 3 associated with the steam turbine 1.

The steam turbine 1 can be part of a turbogenerator set as is found in power stations.

In the present exemplary embodiment, the steam turbine 1 is in two-flow form. As a departure from the present exemplary embodiment, the steam turbine can also be in single-flow form.

In the present exemplary embodiment, the steam turbine 1 is in a form having three subturbines. In this case, the first subturbine is a high-pressure turbine having a first stage group 2b and having a second stage group 2c, the second subturbine is an intermediate-pressure turbine 2a and the third subturbine is a low-pressure turbine 5.

Two or three subturbines in the present exemplary embodiment are accommodated in a common housing, while the third subturbine, i.e. the low-pressure turbine 5, is in an individual housing. As a departure from the present exemplary embodiment, each of the subturbines can also be accommodated in an individual housing each.

The steam turbine controller 3 in the present exemplary embodiment has three subturbine controllers 3a, 3b, 3c. In the present exemplary embodiment, the first subturbine controller 3a is associated with the low-pressure turbine, the second subturbine controller 3b is associated with the intermediate-pressure turbine and the third subturbine controller 3c is associated with the high-pressure turbine.

The subturbine controllers 3a, 3b, 3c in the present exemplary embodiment are each PID controllers. As a departure from the present exemplary embodiment, other controller types can also be used. The subturbine controllers 3a, 3b, 3c can be in the form of analogue or digital controllers. The steam turbine controller 3 can have hardware and/or software components for this purpose.

The subturbine controllers 3a, 3b, 3c are designed to actuate respective turbine valves of the respective subturbines. The turbine valves in the present exemplary embodiment are an intermediate-pressure valve 4a, a fresh-steam valve 4b and an additional fresh-steam valve 4c, which can each be embodied e.g. as classic throttle valves or as a nozzle assembly.

The subturbine controllers 3a, 3b, 3c operate the respective subturbines according to different modes of operation. The modes of operation can be e.g. a power control mode of operation, frequency control, speed control, fresh-steam or pre-pressure control or back pressure control.

In e.g. the power control mode of operation, the electrical power delivered to the public grid is controlled. This mode of operation is possible only when a main grid switch is closed and hence a generator driven by the steam turbine 1 is rigidly connected to the grid.

E.g. during run-up and during special operating situations and faults for the generator and the turbine, the speed is controlled. For drives of other production machines, this mode is the standard case, however. The speed control mode of operation is similar to the frequency control mode of operation, apart from the fact that the generator produces no power, that is to say does not present a load to the steam turbine. The only power loss arises as a result of bearing friction and possibly as a result of directly driven production machines, such as oil pumps.

If the steam turbine 1 is used as an actuating element for the steam pressure in the low-pressure rail, the back pressure control mode of operation is involved. Operation of a fresh-steam valve ensures that the amount of steam taken from the low-pressure load is in equilibrium with the amount flowing into the low-pressure rail and the pressure is maintained. On opening, the back pressure increases, and vice versa. The electrical power delivered to the grid is likewise a byproduct in this instance and varies.

As such, e.g. the individual process variables pressure of the respective subturbine, power of the subturbine and thermal stress or drop in thermal stress of the subturbines can be controlled independently of one another.

Further, the respective subturbine controllers 3a, 3b, 3c are designed to control the power or frequency or to operate them in coasting mode. To this end, the respective subturbine controllers 3a, 3b, 3c having the respective turbine valves, i.e. in the present exemplary embodiment having the intermediate-pressure valve 4a, the fresh-steam valve 4b and the additional fresh-steam valve 4c, are designed to set a respective pressure value, to set a respective power value or to set a respective temperature value.

During operation, respective setpoint values are prescribed for the respective subturbine controllers 3a, 3b, 3c for the respective subturbine, said setpoint values being compared with the respective actual values of the respective subturbines in order to determine a respective control error for the respective subturbines.

From the control error, the respective subturbine controller 3a, 3b, 3c then determines respective manipulated variables, e.g. by using PID algorithms.

As such, a larger control reserve can be kept by virtue of e.g. the power or frequency being controlled using the first stage group 2b and the second stage group 2c of the high-pressure turbine, while e.g. the intermediate-pressure turbine 2a coasts.

Further, it is then possible for a thermal stress to be specifically adjusted e.g. for a first subturbine, i.e. the first stage group 2b and the second stage group 2c of the high-pressure turbine, and for the total power to be controlled for a second subturbine, i.e. the intermediate-pressure turbine 2a, without this requiring structural changes.

In addition, different target variables can be prescribed, so that overload introductions become possible, which is supposed to be used under an optimum of efficiency and control performance.

Additionally, the individual subturbines can be presented with different dynamic loading in order to maintain the block transient.

Finally, the complexity of the controller structure is significantly reduced in this manner, and the flexibility is increased in the same measure. This allows a simpler structure for the steam turbine controller 3, more flexible methods of operation solely by means of the respective setpoint values, more flexible consideration of operating constraints and optimum operation taking into consideration efficiency and control performance.

Although the invention has been illustrated and described more specifically in detail by the exemplary embodiment, the invention is not limited by the disclosed examples, and other variations can be derived therefrom by a person skilled in the art without departing from the scope of protection of the invention.

The invention claimed is:

1. A method for operating a steam turbine, wherein the steam turbine has at least two subturbines, wherein the steam turbine has an associated steam turbine controller that has one subturbine controller for each of the subturbines, the method comprising:
   comparing, via each subturbine controller, respective setpoint values with respective actual values of the respective subturbines during operation in order to determine a respective control error for the respective subturbine, wherein the subturbine controllers operate the respective subturbines according to different modes of operation, wherein a respective power value is set in one of the modes of operation using one of the subturbine controllers,
   actuating, via the subturbine controllers, respective turbine valves that are associated with the respective subturbines,
   controlling, via the respective turbine valves, individual process variables comprising pressure of the respective subturbine, power of the subturbine, and thermal stress or drop in thermal stress of the subturbine, independently of one another.

2. The method as claimed in claim 1, wherein a respective pressure value is set in one of the modes of operation using one of the subturbine controllers.

3. The method as claimed in claim 1, wherein a respective temperature value is set in one of the modes of operation using one of the subturbine controllers.

4. The method as claimed in claim 1, wherein the respective subturbine controllers used are PID controllers.

5. A steam turbine, comprising:
   at least two subturbines, and
   a steam turbine controller associated with the at least two subturbines, the steam turbine controller comprising one subturbine controller for each of the at least two subturbines,
   wherein each subturbine controller is designed to compare respective setpoint values with respective actual values of the respective subturbine during operation in order to determine a respective control error for the respective subturbine, wherein the subturbine controllers are designed to operate the respective subturbines according to different modes of operation, wherein one of the subturbine controllers is designed to set a respective power value in one of the modes of operation,
   wherein the subturbine controllers are designed to actuate respective turbine valves that are associated with the respective subturbines,
   wherein the respective turbine valves control individual process variables comprising pressure of the respective subturbine, power of the subturbine, and thermal stress or drop in thermal stress of the subturbine, independently of one another.

6. The steam turbine as claimed in claim 5, wherein one of the subturbine controllers is designed to set a respective pressure value in one of the modes of operation.

7. The steam turbine as claimed in claim 5, wherein one of the subturbine controllers is designed to set a respective temperature value in one of the modes of operation.

8. The steam turbine as claimed in claim 5, wherein the respective subturbine controllers are PID controllers.

9. A steam turbine controller for a steam turbine having at least two subturbines, the steam turbine controller comprising:
   one subturbine controller for each of the at least two subturbines,
   wherein each subturbine controller is designed to compare respective setpoint values with respective actual values of the respective subturbine during operation in order to determine a respective control error for the respective subturbine, wherein the subturbine controllers are designed to operate the respective subturbines according to different modes of operation, wherein one of the subturbine controllers is designed to set a respective power value in one of the modes of operation,
   wherein the subturbine controllers are designed to actuate respective turbine valves that are associated with the respective subturbines,
   wherein the individual turbine valves control individual process variables comprising pressure of the respective subturbine, power of the subturbine, and thermal stress or drop in thermal stress of the subturbine, independently of one another.

* * * * *